United States Patent [15] 3,679,911

Kaufman [45] July 25, 1972

[54] DECODER CIRCUIT

[72] Inventor: Melvin Murray Kaufman, Willingboro, N.J.

[73] Assignee: RCA Corporation

[22] Filed: May 28, 1970

[21] Appl. No.: 41,324

[52] U.S. Cl. ..............................................307/251, 307/241

[51] Int. Cl. .....................................H03k 17/00, H03k 19/24

[58] Field of Search .....340/347 DD, 147 T, 147 R, 147 MD, 340/166 R; 307/217, 241, 242, 243, 251, 205, 304, 221 C

[56] References Cited

UNITED STATES PATENTS

| | | | |
|---|---|---|---|
| 3,480,796 | 11/1969 | Polkinghorn et al. | 307/205 X |
| 3,529,176 | 9/1970 | Chapman et al. | 307/217 X |

*Primary Examiner*—Maynard R. Wilbur
*Assistant Examiner*—Thomas J. Sloyan
*Attorney*—H. Christoffersen

[57] ABSTRACT

A decoder including a plurality of input terminals and a plurality of circuits between these terminals and a common output terminal. Each circuit includes an inverter, such as one formed of at least one P-type metal-oxide semiconductor (PMOS) device for deriving from the signal applied to its input terminal a complementary signal, and a second circuit. The latter may include two PMOS devices the conduction paths of which are connected in series, one such path controlled by the complementary signal and the other by the input signal, and an output terminal at the common connection of these two devices. In response to a group of control signals on one value, one circuit is placed in its operating state and each other circuit is rendered inoperative by essentially opening the series connected conduction paths of the two PMOS devices of the circuit.

3 Claims, 1 Drawing Figure

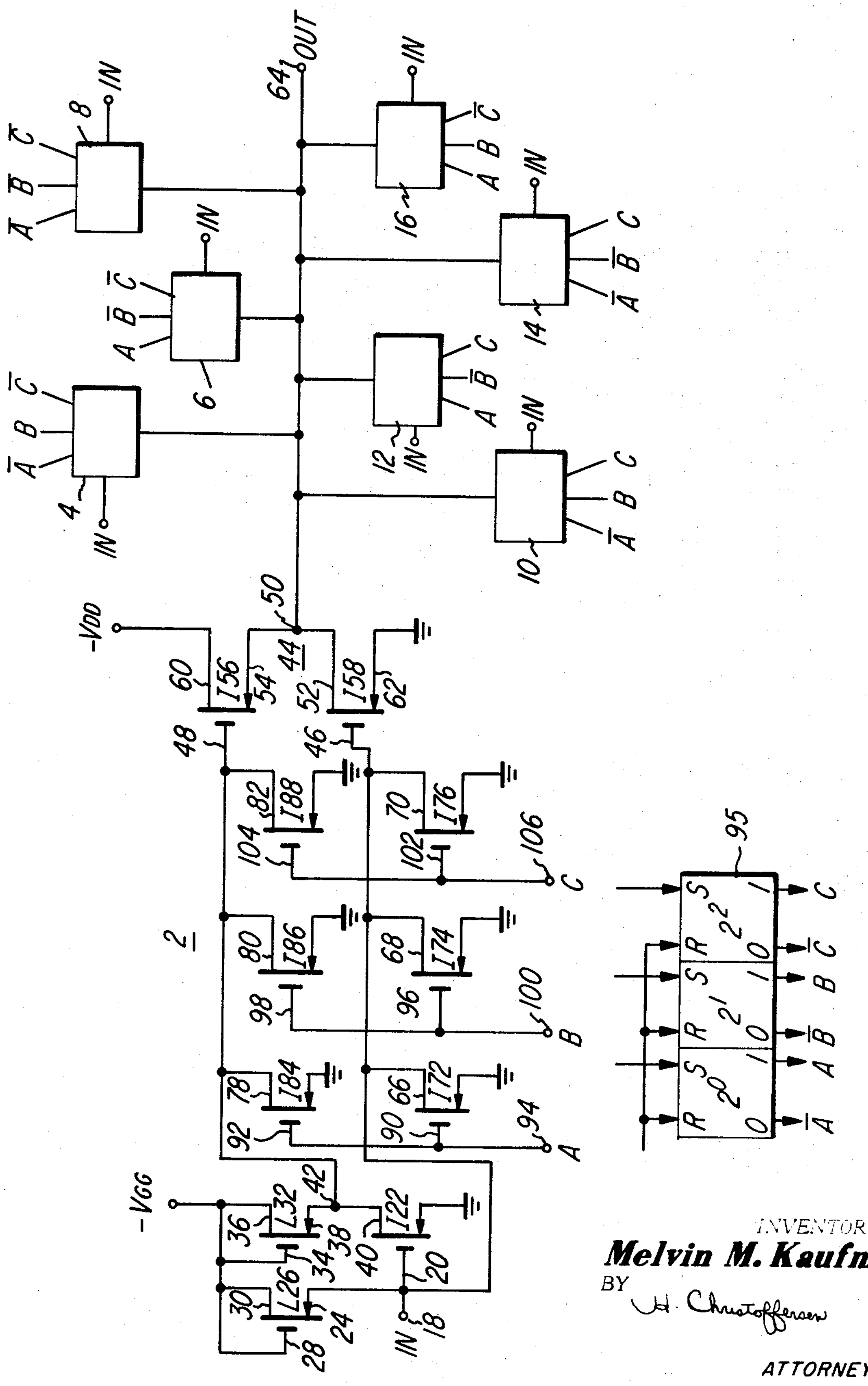
INVENTOR.
Melvin M. Kaufman
BY H. Christoffersen
ATTORNEY

DECODER CIRCUIT

BACKGROUND OF THE INVENTION

A decoder is a device having a plurality of independent inputs and a greater plurality of outputs, characterized in that a different output is energized for each different combination of independent inputs. By definition, the outputs of decoders are mutually exclusive.

This invention provides a relatively simple and inexpensive circuit which is useful, for example, in decoding and reading from groups of memory cells or other types of data sources.

SUMMARY OF THE INVENTION

There is a first terminal to which a voltage representing one binary value may be applied and a second terminal to which a voltage representing the other binary value may be applied. A common output third terminal is also included. A first switch is connected between the first and third terminals and a second switch is connected between the second and third terminals. Means responsive to an input signal of one binary value opens the first and closes the second switch and in response to an input signal of the other binary value opens the second and closes the first switch. Means responsive to a control signal manifestation concurrently opens both switches.

BRIEF DESCRIPTION OF THE DRAWING

The sole FIGURE is a schematic and block diagram of the invention.

DETAILED DESCRIPTION

A PMOS device of the enhancement type is a voltage controlled device in which the source-to-drain region presents a high impedance path when the gate electrode is maintained at the same or a more positive potential than the potential applied to the source electrode. The source-to-drain region presents a low impedance path when the gate-to-source potential ($V_{GS}$) is maintained at a potential at least equal to a threshold voltage $V_T$, and is of the same polarity as the drain-to-source voltage ($V_{DS}$).

The convention adopted is that a relatively negative potential, which is greater in magnitude than threshold voltage $V_T$ of the PMOS device, represents a binary 1 and that a relatively positive potential, for example, ground, represents a binary 0.

The sole figure illustrates a circuit 2 which is useful in reading from, for example, a memory cell or sensing data from any source whatsoever. Circuits 4, 6, 8, 10, 12, 14 and 16 are identical to the circuit 2, but are shown in block form to simplify the drawing. Only one of the n circuits at a time may sense input data.

An input terminal 18 is connected to receive data from the memory cell or data source. The input terminal is connected to the gate electrode 20 of an inverting, P-type metal oxide semiconductor device (PMOS) 22 and to the source electrode 24 of a PMOS load device 26, which acts as a load (L) for the memory cell. The gate and drain electrodes 28 and 30, respectively, are connected together and to a source of operating potential $-V_{GG}$. A load PMOS device 32 has its gate and drain electrodes 34 and 36, respectively tied in common to the source $-V_{GG}$ and its source electrode 38 connected to the drain electrode 40 of inverting PMOS device 22, the connection forming an output terminal 42 for the inverter 22.

A circuit 44 (shown near the center of the figure) has a first input terminal 46 connected to input terminal 18 and a second input terminal 48 connected to the output terminal 42 of inverter 22. The first and second input terminals 46 and 48 are the gate electrodes for the PMOS devices 58 and 56, respectively. The output terminal 50 of circuit 44 is formed by the connection of drain electrode 52 and source electrode 54 of PMOS switch devices 58 and 56, respectively. The drain electrode 60 of switch device 56 is connected to a source of operating potential $-V_{DD}$, which represents a binary 1 level. The source electrode 62 of switch device 58 is connected to a source of reference potential such as ground, which represents a binary 0 level.

The output terminal 50 of circuit 44, which forms the output terminal of circuit 2, is connected in common with the output terminals of the circuits 4, 6, 8, 10, 12, 14 and 16 to a common output terminal 64 which may be connected to any suitable utilization device such as a computer or the like (not shown).

Connected to the first input terminal 46 of circuit 44 are the drain electrodes 66, 68 and 70 of PMOS switch devices 72, 74 and 76, respectively. Connected to the second input terminal 48 of the circuit 44 are the drain electrodes 78, 80 and 82 of PMOS switch devices 84, 86 and 88, respectively. The gate electrodes 90 and 92 of PMOS switches 72 and 84, respectively, are connected in common to an input terminal 94. The gate electrodes 96 and 98 of PMOS switches 74 and 86 are connected in common to an input terminal 100. The gate electrodes 102 and 104 of PMOS switches 76 and 88, respectively, are connected in common to an input terminal 106.

In the operation of the circuit of the sole figure, any signal applied to input terminal 18 is inverted and sensed at output terminal 50 only when input signals A, B and C which are applied to input terminals 94, 100 and 106, respectively, are concurrently at the binary 0 (ground) level. Under these conditions, devices 72, 74, 76, 84, 86 and 88 are held nonconductive since their gate and source electrodes are all at ground. Control signals A, B and C and their complements A, B and C may be supplied, for example, by a control device such as data register 95 having three bistable stages. The output signals appearing at the 0 and 1 output terminals of a stage are the binary complements of one another. The output signals of the stages are applied to the circuits 2–16 as designated on the drawings.

If the input signal applied to input terminal 18 is at ground potential, devices 22 and 58 are cut off and device 32 conducts. The source-to-drain path of device 32 exhibits a low impedance so that gate electrode 48 is at a potential close to $-V_{GG}$. Device 56, therefore, exhibits a low impedance from its source to its drain electrode and, inasmuch as device 58 is cut off, output terminal 50 is at a negative potential representing a 1.

If A, B and C are all at ground and a relatively negative signal representing a binary 1 is applied to terminal 18, device 22 conducts. This places point 42 at close to ground potential and device 56 is cut off. Device 58 conducts in view of the negative signal at its gate electrode and output terminal 50 is at approximately ground potential, representing at binary 0.

The device 26, when it conducts, simply acts as a load resistor for the stage (not shown) supplying the input signal to terminal 18.

If any one or more of the input signals A, B and C are negative, representing binary 1, switch devices 56 and 58 are biased off and this places a high impedance between both the drain 60 of transistor 56 and the source 62 of transistor 58 and the output terminal 50. Thus, regardless of the value of the input signal applied to the terminal 18, the output terminal 50 is isolated therefrom and not affected thereby. For example, when control signal A represents a 1 (is negative), devices 72 and 84 conduct, providing low impedance paths from gate electrodes 46 and 48, respectively, to ground. As gate electrode 46 is at ground — the same potential as its source electrode — device 58 is cut off. The potential (ground) at the gate electrode 48 is less than that needed to cause conduction through the device 56 and it too is cut off. The operation is the same when any other signal B or C, or combinations of A, B and C, are negative. In any such case, an essentially open circuit exists between the input terminal 18 and output terminal 50 and the circuit 2 is rendered inoperative.

Assume now that control signals A, B and C are concurrently at a binary 0 level such that circuit 2 is in an operative or inverting condition. The remaining circuits 4, 6 . . . 14, 16 are inoperative because each such circuit receives at least one signal representing a 1. Note that the remaining stages all have at least one input A, B or C. It is also clear from the drawing that when any other circuit 4, 6 and so on is on (is in its operating condition), the remaining seven circuits are all inoperative.

For the circuit arrangement shown, one data source out of eight may be read at a given time. It is clear that a greater or lesser number of data sources may be accessed depending on the number of control signals applied. For example, if control signals A, A and B, B are utilized, one out of four data sources may be read at a given time.

What is claimed is:

1. In combination:

a first inverter comprising a first MOS device having a conduction path, a control terminal for controlling the conductivity of said conduction path, and an output terminal at one end of said conduction path, at which an output signal complementary to an input signal applied to said control terminal is produced;

second and third MOS devices, the conduction paths of which are connected in series, each such device also having a control terminal;

an output terminal at the connection between the conduction paths of said second and third devices;

a connection from the control terminal of the first device to the control terminal of the second device;

a connection from the output terminal of the first device to the control terminal of the third device;

a first terminal to which is supplied a voltage which, if applied to the control terminals of said second and third MOS devices, would render said devices nonconductive;

at least one pair of switches, one switch connected between the control terminal of said second MOS device and said first terminal and the other switch being connected between the control terminal of said third MOS device and said first terminal; and means for supplying a signal for concurrently closing said pair of switches and thereby supplying the voltage at said first terminal to the control terminal of said second and third MOS devices and rendering said second and third MOS devices nonconductive.

2. The combination claimed in claim 1, said pair of switches being comprised of fourth and fifth MOS devices each having a conduction path and a control terminal for controlling the conductivity of the path, the conduction path of said fourth MOS device being connected between the control terminal of said second MOS device and said first terminal and the conduction path of said fifth MOS device being connected between the control terminal of said third MOS device and said first terminal, the control terminals of said fourth and fifth MOS devices being connected together and to said means for supplying a signal.

3. The combination claimed in claim 2, said means for supplying a signal for concurrently closing said pair of switches comprising:

a second terminal to which a voltage having a first and second value may be applied, the first value being of a sense, if applied to the control terminals of said fourth and fifth MOS devices would render them conductive and the second value being of a sense, if applied to the control terminals of said fourth and fifth MOS devices, would render them nonconductive; and means for connecting the control terminals of said fourth and fifth MOS devices to said second terminal.

* * * * *

UNITED STATES PATENT OFFICE
CERTIFICATE OF CORRECTION

Patent No. 3,679,911 Dated July 25, 1972

Inventor(s) Melvin Murray Kaufman

It is certified that error appears in the above-identified patent and that said Letters Patent are hereby corrected as shown below:

In the Abstract, line 11, "on" should be --- of ---

Column 2, line 27, "A, B and C" (second occurrence) should be --- $\overline{A}$, $\overline{B}$ and $\overline{C}$ ---

Column 2, line 75, after "a" insert --- binary ---

Column 3, line 1, "A, B or C" should be --- $\overline{A}$, $\overline{B}$ or $\overline{C}$ ---

Column 3, line 9, "A, A and B, B" should be --- A, $\overline{A}$ and B, $\overline{B}$ --

Signed and sealed this 26th day of June 1973.

(SEAL)
Attest:

EDWARD M.FLETCHER,JR.
Attesting Officer

ROBERT GOTTSCHALK
Commissioner of Patents